US006468177B2

United States Patent
Park

(10) Patent No.: US 6,468,177 B2
(45) Date of Patent: Oct. 22, 2002

(54) POWER TRAIN FOR AUTOMATIC TRANSMISSIONS

(75) Inventor: Sung-Hoon Park, Yongin (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 09/740,829

(22) Filed: Dec. 21, 2000

(65) Prior Publication Data

US 2001/0006920 A1 Jul. 5, 2001

(51) Int. Cl.$^7$ .............................................. F16H 57/10
(52) U.S. Cl. ........................ 475/271; 475/280; 475/281; 475/285; 475/286; 475/287; 192/48.92
(58) Field of Search ................................ 475/271, 280, 475/281, 285, 286, 287; 192/48.92

(56) References Cited

U.S. PATENT DOCUMENTS

| | | | | |
|---|---|---|---|---|
| 4,607,541 A | * | 8/1986 | Miura et al. ................. | 475/146 |
| 5,006,102 A | * | 4/1991 | Takase et al. ................ | 475/282 |
| 5,879,263 A | * | 3/1999 | Haka ........................... | 475/276 |
| 6,024,197 A | * | 2/2000 | Suwa et al. ................. | 192/48.92 |
| 6,200,242 B1 | * | 3/2001 | Coffey ......................... | 475/281 |

* cited by examiner

Primary Examiner—Dirk Wright
Assistant Examiner—Eric M. Williams
(74) Attorney, Agent, or Firm—Birch, Stewart, Kolasch & Birch, LLP

(57) ABSTRACT

A power train for an automotive transmission includes first and second planetary gear sets disposed around an input shaft. The first and second planetary gear sets include a first sun gear, a first planet carrier, and a first ring gear. The second planetary gear set includes a second sun gear, a second planet carrier, and a second ring gear; the first planet carrier being fixedly connected to the second ring gear. The first sun gear is connected to the input shaft with a first clutch interposed between the first sun gear and the input shaft. The second planet carrier is connected to the input shaft with a second clutch interposed between the second planet carrier and the input shaft, and the second sun gear is connected to the input shaft with a third clutch interposed between the second sun gear and the input shaft. The fourth clutch and the second one-way clutch are disposed spaced away from each other in the axial direction of the input shaft. The second sun gear is connected to the transmission housing via a second brake. The first and second brakes share a retainer with each other; the first and second one-way clutches are supported by a single support and the second and third clutches are arranged spaced away from each other in a radial direction of the input shaft.

10 Claims, 3 Drawing Sheets

POWER TRAIN FOR AUTOMATIC TRANSMISSIONS

BACKGROUND OF THE INVENTION (a) Field of the Invention

The present invention relates to a power train for an automatic transmission used in vehicles. More particularly, the invention relates to a power train for a 4-forward speed and 1-reverse speed automatic transmission.

(b) Description of the Related Art

Generally, automatic transmission systems for vehicles are provided with a transmission control unit (TCU) which automatically controls shift ratios according to changes in a running condition of the vehicle.

The typical TCU controls a plurality of friction elements provided in a gear train to either operative or inoperative states to select one of the three essential elements of a planetary gear set (i.e., a sun gear, a ring gear, or a planet carrier) to be an input element, a reaction element, or an output element, thereby controlling an output number of revolutions.

Particularly, a power train that can realize 4-forward speeds and 1-reverse speed comprises a plurality of heavy and large-sized clutches and brakes and a plurality of situationally inoperative friction elements.

FIG. 3 shows such a conventional power train.

The conventional power train includes first and second single pinion planetary gear sets 208 and 210. The first single pinion planetary gear set 208 includes a first sun gear 216, a first planet carrier 212, and a first ring gear 218. The second single pinion planetary gear set 210 includes a second sun gear 220, a second planet carrier 222, and a second ring gear 224.

Rotation power of an engine (not shown) is transmitted to an input shaft 206 via a torque converter 204, then is further transmitted to the first and second single planetary gear sets 208 and 210, and finally output through a transfer drive gear 214 connected to the first planet carrier 212. The shifting operation is realized while the rotation power of the engine passes through the first and second single planetary gear sets 208 and 210.

The first planet carrier is fixedly connected to the second ring gear 224 and the first sun gear 216 is variably connected to the input shaft 206 with a first clutch C1 interposed therebetween. The first clutch C1 is operated in all of the forward speed ratios.

The second planet carrier 222 is variably connected to the input shaft 206 with a second clutch C2 interposed therebetween, and the second sun gear 220 is variably connected to the input shaft 206 with a third clutch C3 interposed therebetween. The second clutch C2 is operated in third and fourth forward speed ratios, and the third clutch C3 is operated in a reverse range.

In addition, the second planet carrier 222 is fixedly connected to the first ring gear 218, and the combination of the second planet carrier 222 and the first ring gear 218 is connected to the transmission housing 226 with a first brake B1 interposed therebetween. The second sun gear 220 is connected to the transmission housing 226 with a second brake B2 interposed therebetween.

The power output through the transfer drive gear 214 is dispensed to a drive shaft through an intermediate shaft 228 and a differential 230.

In the above described prior power train, since the first clutch, the first brake, and the second brake are arranged such that they are spaced away from each other in an axial direction of the transmission housing, the longitudinal length of the housing is increased, limiting space for disposing one-way clutches which are used for improving shift quality.

SUMMARY OF THE INVENTION

Therefore, the present invention has been made in an effort to solve the above problems.

It is an objective of the present invention to provide a power train for an automatic transmission that is lightweight and compact in size, while at the same time providing improved power efficiency.

To achieve the above object, the present invention provides a power train for an automotive automatic transmission comprising a first planetary gear having a plurality of operating elements; a second planetary gear having a plurality of operating elements, at least one of the operating elements of the second planetary gear being fixedly connected to one of the operating elements of the first planetary gear; and a plurality of clutches, brakes, and one-way clutches for variable connecting elements of the first and second planetary gears to an input shaft, a transmission housing, or to each other, wherein at least two of the clutches are arranged spaced away from each other in a radial direction of the input shaft.

At least two of the brakes share a single retainer with each other, and one of the two clutches arranged spaced away from each other in a radial direction of the input shaft has a piston functioning as a retainer of the other of the two clutches.

The two clutches arranged spaced away from each other in a radial direction of the input shaft share a single spring with each other.

The plurality of operating elements of the first planetary gear comprise a first sun gear, a first planet carrier, and a first ring gear; the plurality of operating elements of the second planetary gear comprise a second sun gear, a second planet carrier, and a second ring gear; the first planet carrier is fixedly connected to the second ring; the plurality of clutches comprise first, second and third clutches for variably connecting the first sun gear, the second planet carrier, and the second sun gear to the input shaft, respectively, and a fourth clutch for variable connecting the second planet carrier to the first ring gear; the plurality of brakes comprise first and second brakes for connecting the second planet carrier and the second sun gear to the transmission housing; the plurality of one-way clutches comprise first and second one-way clutches for connecting the second planet carrier to the ring gear and the transmission housing; and the second and third clutches are the two clutches arranged spaced away from each other in a radial direction of the input shaft.

According to another aspect, the present invention provides an automotive automatic transmission comprising a first planetary gear having a plurality of operating elements; a second planetary gear having a plurality of operating elements, at least one of the operating elements of the second planetary gear being fixedly connected to one of the operating elements of the first planetary gear; and a plurality of clutches, brakes, and one-way clutches for variable connecting elements of the first and second planetary gears to an input shaft, a transmission housing, or to each other, wherein inner and outer races of the respective first and second one-way clutches of the plurality of one-way clutches share a single member with each other.

An outer race of the first one-way clutch is connected to the transmission housing by a spline.

The outer race of the second one-way clutch functions as a retainer of at least one of the brakes.

The inner and outer races of the respective first and second one-way clutches are separately formed and splined to each other to form the single member.

At least two of the clutches are arranged spaced away from each other in a radial direction of the input shaft.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 1:
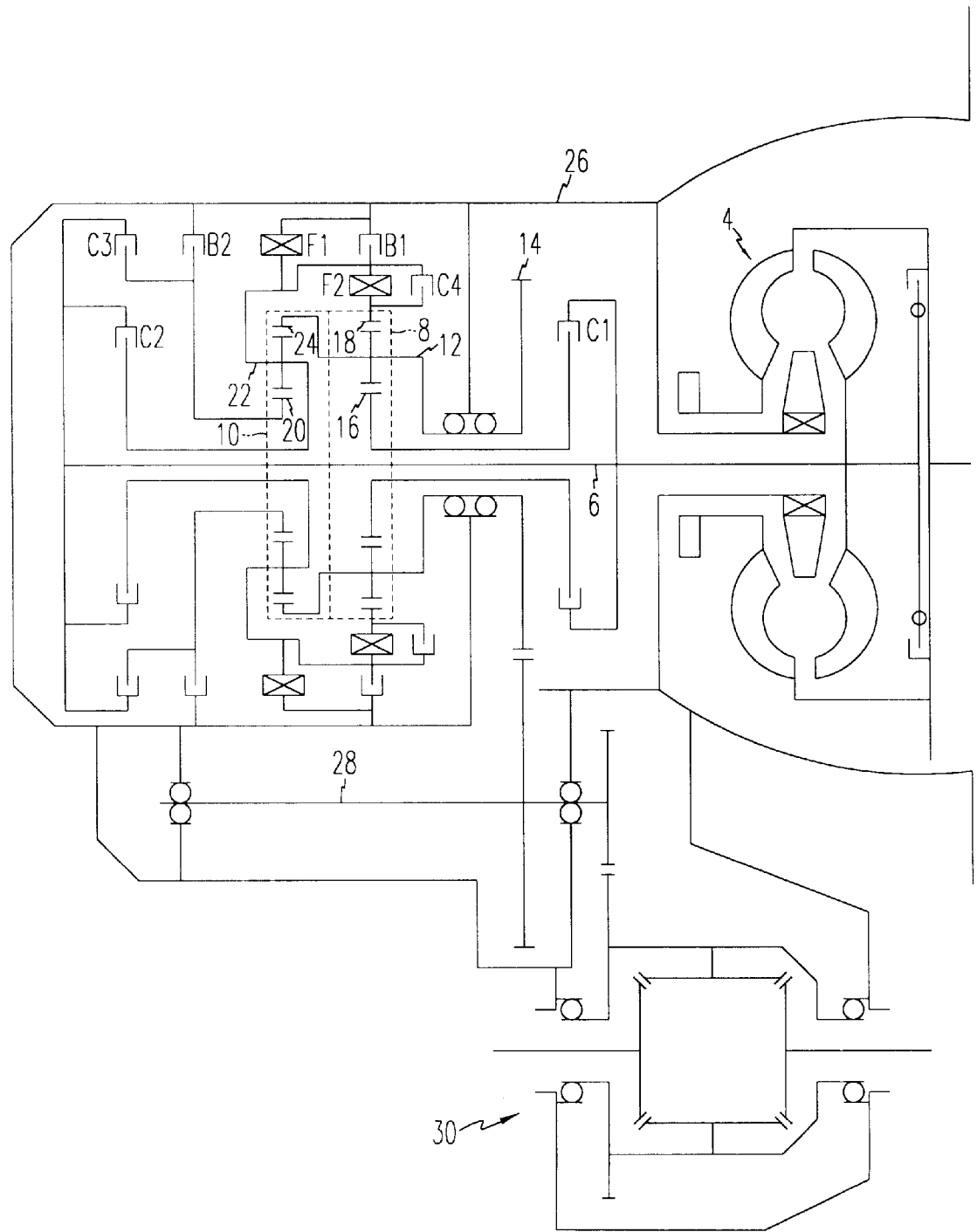
FIG. 1 is a schematic diagram of a power train for an automatic transmission according to a preferred embodiment of the present invention.

FIG. 1 shows a schematic diagram of a power train according to a preferred embodiment of the present invention.

The inventive power train comprises first and second planetary gear sets 8 and 10 that are disposed around an input shaft 6. The first and second planetary gear sets 8 and 10 are of a single pinion type. Output is realized through a transfer drive gear 14 connected to the first planetary gear set 8.

The first planetary gear set 8 includes a first sun gear 16, a first planet carrier 12, and a first ring gear 18. The second planetary gear set 10 includes a second sun gear 20, a second planet carrier 22, and a second ring gear 24.

The first planet carrier 12 is fixedly connected to the second ring gear 24, and the first sun gear 16 is connected to the input shaft 6 with a first clutch C1 interposed therebetween. The first clutch C1 operates in all forward speed ratios.

The second planet carrier 22 is connected to the input shaft 6 with a second clutch C2 interposed therebetween. The second clutch C2 operates in third and fourth speeds. The second sun gear 20 is connected to the input shaft 6 with a third clutch C3 interposed therebetween.

In addition, the second planet carrier 22 is connected to a transmission housing 26 via a first brake B1 and a first one-way clutch F1. The first brake B1 and the first one-way clutch F1 are disposed spaced away from each other in an axial direction of the input shaft. The second planet carrier 22 is further connected to the first ring gear 18 via a fourth clutch C4 and a second one-way clutch F2. The fourth clutch C4 and the second one-way clutch F2 are disposed spaced away from each other in the axial direction of the input shaft.

The second sun gear 20 is connected to the transmission housing 26 via a second brake B2.

Figure 2:
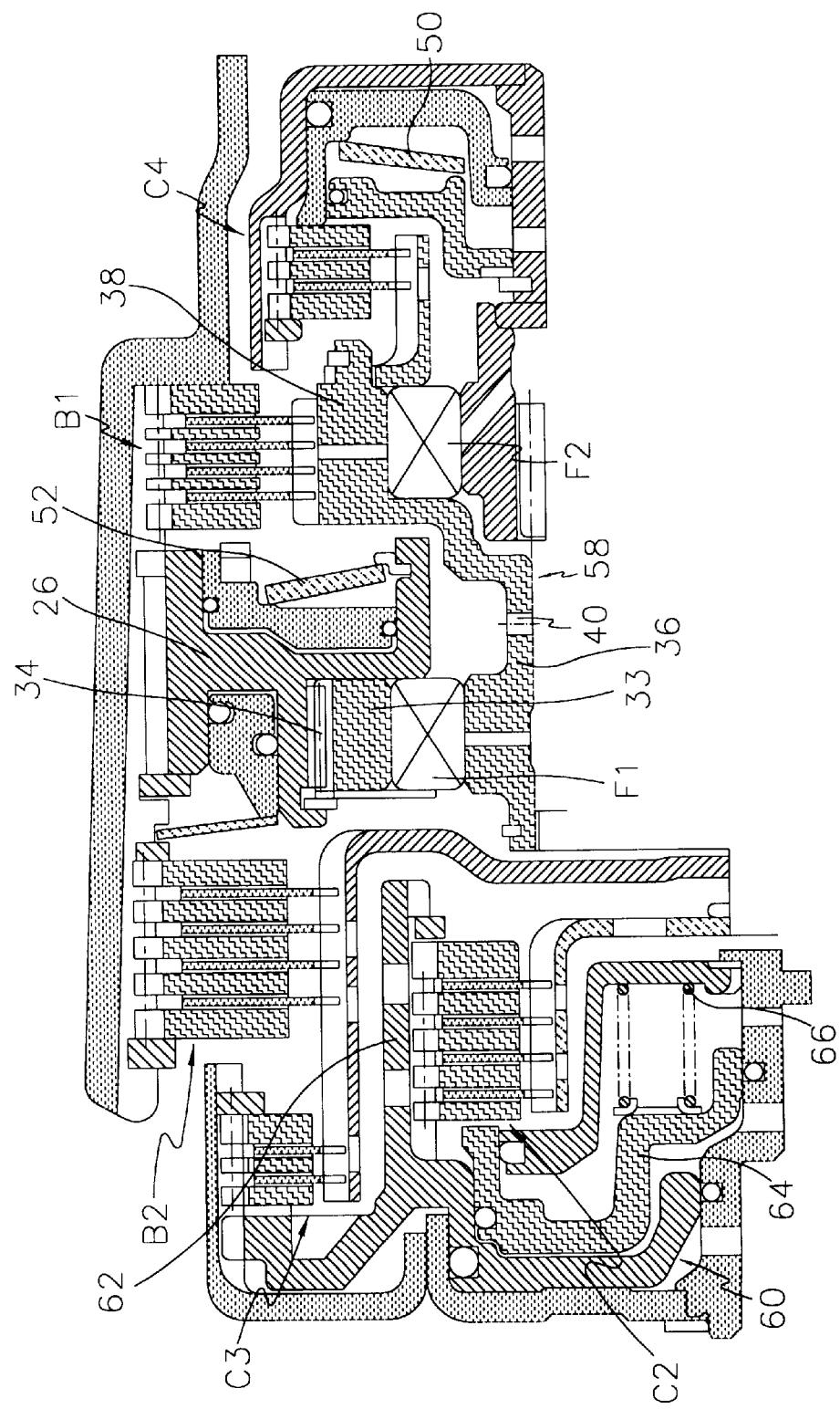
FIG. 2 is a detailed view of a major portion of a power train for an automatic transmission according to a preferred embodiment of the present invention.
Figure 3:
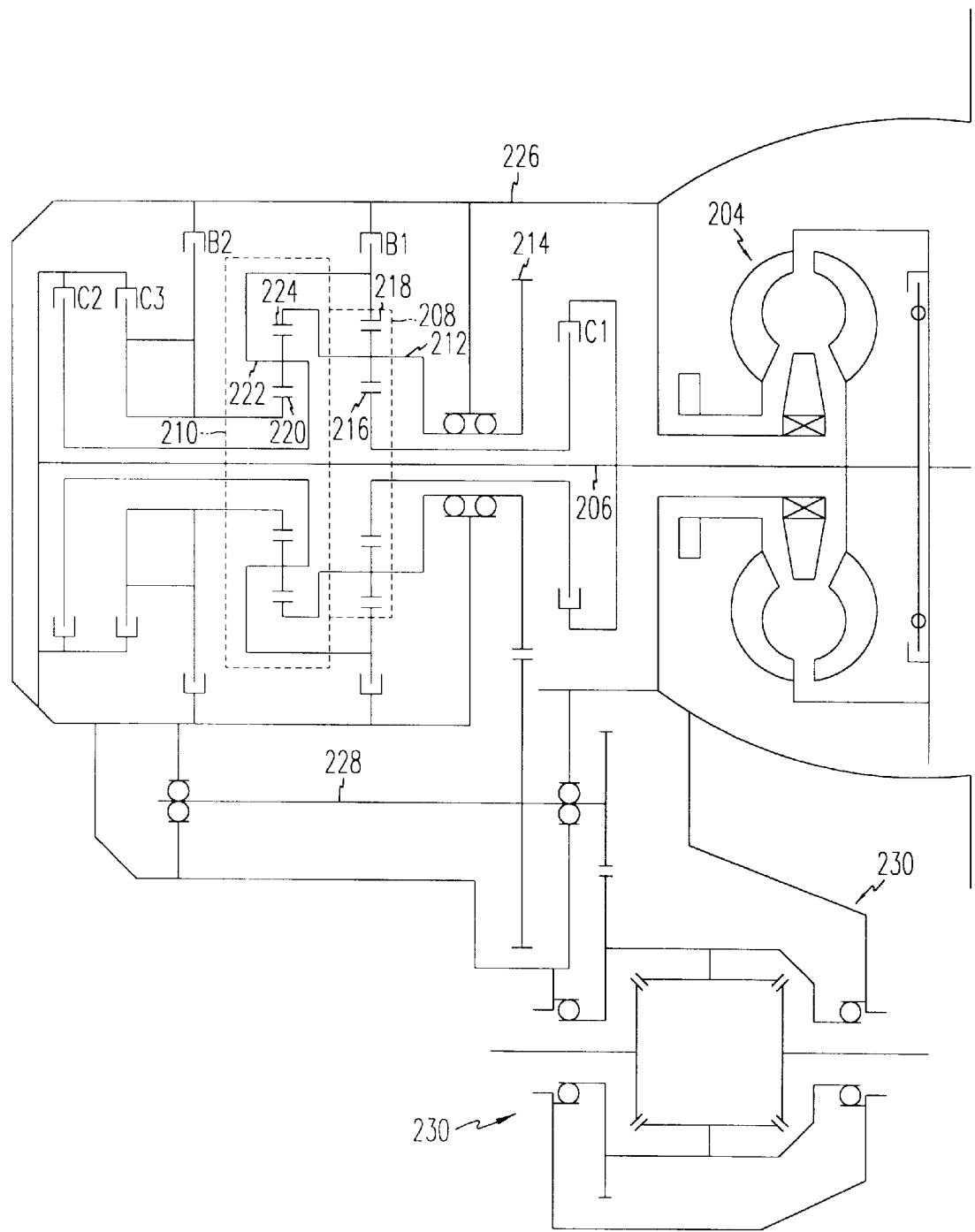
FIG. 3 is a schematic diagram of a conventional power train.

The operation of the above-described power train will be described hereinafter, with reference to FIG. 1 and FIG. 2.

In a first forward speed, the first clutch C1 and the first and second one-way clutches F1 and F2 operate, the first sun gear 16 acts as an input element, and the first ring gear 18 and the second planet carrier 22 act as reacting elements.

In a second forward speed, the second brake B2 operates in the first forward speed state so that the second sun gear 20 acts as the reacting element in a state where the first sun gear 18 acts as the input element.

In a third forward speed, the second clutch C2 operates and the second brake B is released in the second forward state so that the first and second planetary gear sets 8 and 10 are locked, thereby outputting a speed equal to the input speed.

In a fourth forward speed, the second brake operates in the third forward speed state so that the second sun gear 20 acts as the reacting element, thereby realizing the fourth forward speed which is an overdrive state.

In a reverse range, the third clutch C3 and the first brake B1 operate so that the second sun gear 20 and the second planet carrier 22 act as the input and reacting elements, respectively.

All of the friction elements C1, C2, C3, C4, B1 and B2 are formed as wet-type multi-plate clutches.

Furthermore, return springs of the fourth clutch C4 and the first and second brakes B1 and B2 are all formed as dish-shaped springs so as to minimize the longitudinal length of the power train.

In addition, the first and second brakes B1 and B2 are designed to share a retainer -with each other, thereby reducing the number of parts. The first and second one-way clutches F1 and F2 are packaged. That is, the first and second one-way clutches F1 and F2 are sub-assembled to the retainer 58 of the first brake B1, and the second and third clutches C2 and C3 are arranged spaced from each other in a radial direction from the input shaft, thereby reducing the length of the power train.

That is, the third clutch C3 is disposed on a radial outer side and has a piston 60 integrally formed with a retainer 62 for the second clutch C2. A piston 64 for the second clutch C2 is disposed inside the piston 60 for the third clutch C3 such that the pistons 60 and 64 share a return spring 66 with each other, resulting in reducing the number of parts and shortening the longitudinal length of the power train.

In addition, the first one-way clutch F1 is installed in the transmission housing 26 in such a way that an outer race of the first one-way clutch F1 is connected to the transmission housing by a spline 34, and an inner race 36 of the first one-way clutch F1 is shared with an outer race 38 of the second one-way clutch F2 so as to be interconnected by a spline 40. Also, the outer race 38 of the second one-way clutch F2 is formed so as to be used as a retainer for the first brake B1.

When two one-way clutches share a common race, a contra-directional force can cause popping effects. In the power train of the present invention, however, since the inner race 36 of the first one-way clutch F1 and the outer race 38 of the second one-way clutch F2 are individually formed and connected to each other by a spline 40, the popping problem as in the prior art power train is avoided.

Reference numerals 28 and 30 which are not described above indicate an intermediate shaft and a differential, respectively.

As described above, since the return springs for the respective third clutch and first and second brakes are formed in a dish shape and the elements share an associated element with each other, the number of parts of the power train can be reduced, while simplifying the manufacturing process and improving fuel consumption by lightening the weight.

In addition, since the power train of the automatic transmission of the present invention is provided with two one-way clutches in such a configuration that the inner race of the first one-way clutch and the outer race of the second one-way clutch are coupled to each other by a spline, as well as because the two one-way clutches are coaxially installed, the automatic transmission can be compact and provides enhanced shift quality.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A power train for an automotive automatic transmission, comprising:

a first planetary gear having a plurality of operating elements;

a second planetary gear having a plurality of operating elements, at least one of the operating elements of the second planetary gear being fixedly connected to one of the operating elements of the first planetary gear; and a plurality of clutches, brakes, and one-way clutches for variably connecting elements of the first and second planetary gears to an input shaft, a transmission housing, or to each other, wherein at least two of the clutches are arranged spaced away from each other in a radial direction of the input shaft, and the plurality of operating elements of the first planetary gear comprise a first sun gear, a first planet carrier, and a first ring gear;

the plurality of operating elements of the second planetary gear comprise a second sun gear, a second planet carrier, and a second ring gear;

the first planet carrier is fixedly connected to the second ring gear;

the plurality of clutches comprise first, second and third clutches for variably connecting the first sun gear, the second planet carrier, and the second sun gear to the input shaft, respectively, and a fourth clutch for variable connecting the second planet carrier to the first ring gear;

the plurality of brakes comprise first and second brakes for connecting the second planet carrier and the second sun gear to the transmission housing;

the plurality of one-way clutches comprise first and second one-way clutches for connecting the second planet carrier to the first ring gear and the transmission housing; and the second and third clutches are the two clutches arranged spaced away from each other in a radial direction of the input shaft.

2. The power train of claim 1 wherein at least two of the brakes share a single retainer with each other.

3. The power train of claim 1 wherein one of the two clutches arranged spaced away from each other in a radial direction of the input shaft has a piston functioning as a retainer of the other of the two clutches.

4. The power train of claim 1 wherein the two clutches arranged spaced away from each other in a radial direction of the input shaft share a single spring with each other.

5. A power train for an automotive automatic transmission, comprising:

a first planetary gear having a plurality of operating elements;

a second planetary gear having a plurality of operating elements, at least one of the operating elements of the second planetary gear being fixedly connected to one of the operating elements of the first planetary gear; and a plurality of clutches, brakes, and one-way clutches for variably connecting elements of the first and second planetary gears to an input shaft, a transmission housing, or to each other, wherein inner and outer races of respective first and second one-way clutches of the plurality of one-way clutches share a single member with each other, wherein the inner and outer races of the respective first and second one-way clutches are separately formed and splined to each other to form the single member.

6. The power train of claim 5 wherein an outer race of the first one-way clutch is connected to the transmission housing.

7. The power train of claim 6 wherein the connection between the outer race of the first one-way clutch and the transmission housing is realized by a spline.

8. The power train of claim 5 wherein the outer race of the second one-way clutch functions as a retainer of at least one of the brakes.

9. The power train of claim 5 wherein at least two of the clutches are arranged spaced away from each other in a radial direction of the input shaft.

10. A power train for an automotive automatic transmission, comprising:

a first planetary gear having a plurality of operating elements;

a second planetary gear having a plurality of operating elements, at least one of the operating elements of the second planetary gear being fixedly connected to one of the operating elements of the first planetary gear; and a plurality of clutches, brakes, and one-way clutches for variably connecting elements of the first and second planetary gears to an input shaft, a transmission housing, or to each other, wherein inner and outer races of respective first and second one-way clutches of the plurality of one-way clutches share a single member with each other, and the plurality of operating elements of the first planetary gear comprise a first sun gear, a first planet carrier, and a first ring gear;

the plurality of operating elements of the second planetary gear comprises a second sun gear, a second planet carrier, and a second ring gear;

the first planet carrier is fixedly connected to the second ring gear;

the plurality of clutches comprise first, second and third clutches for variably connecting the first sun gear, the second planet carrier, and the second sun gear to the input shaft, respectively, and a fourth clutch for variably connecting the second planet carrier to the first ring gear;

the plurality of brakes comprise first and second brakes for connecting the second planet carrier and the second sun gear to the transmission housing; and the plurality of one-way clutches comprise first and second one-way clutches for connecting the second planet carrier to the first ring gear and the transmission housing.

* * * * *